United States Patent [19]

Katz

[11] Patent Number: 5,143,343

[45] Date of Patent: Sep. 1, 1992

[54] AUTOMOBILE RADIO SECURITY SYSTEM

[76] Inventor: Daniel P. Katz, 132 Cornell Rd., Bala Cynwyd, Pa. 19004

[21] Appl. No.: 462,267

[22] Filed: Jan. 9, 1990

[51] Int. Cl.⁵ .............................................. F16M 13/00
[52] U.S. Cl. ..................... 248/551; 312/7.1; 361/422
[58] Field of Search .............. 248/27.1, 27.3, 551, 248/553; 361/422; 70/57, 58, 258; 312/7.1, 245

[56] References Cited

U.S. PATENT DOCUMENTS

| | | | |
|---|---|---|---|
| 4,028,913 | 6/1977 | Falk | 70/258 X |
| 4,245,872 | 1/1981 | Kakigi | 312/7.1 X |
| 4,248,069 | 2/1981 | Burbank | 70/258 X |
| 4,557,445 | 12/1985 | Ohara | 248/27.1 |
| 4,660,900 | 4/1987 | Paterlini | 312/7.1 |
| 4,687,172 | 8/1987 | Stillback | 248/551 |
| 4,726,632 | 2/1988 | Pori | 312/7.1 |
| 4,738,420 | 4/1988 | Angle | 312/7.1 X |
| 4,784,357 | 11/1988 | Kimura | 248/551 X |
| 4,829,595 | 5/1989 | Kobayashi | 312/7.1 X |
| 4,862,715 | 9/1989 | Cykman | 70/258 X |
| 4,884,646 | 12/1989 | Zambias | 312/7.1 X |
| 4,903,851 | 2/1990 | Slough | 248/27.1 X |
| 4,947,661 | 8/1990 | Yoshida | 70/57 |
| 4,955,678 | 9/1990 | Kobayashi | 312/7.1 X |
| 4,995,680 | 2/1991 | Miruri | 312/7.1 |

*Primary Examiner*—J. Franklin Foss
*Attorney, Agent, or Firm*—Robert F. Zielinski

[57] ABSTRACT

An automobile radio security system for protecting car radios and similar equipment using a locked chamber linked to the car using a mounting device located in a clear area on the fire wall. The device can be modified during production and installation to accommodate car telephones and any other related instruments.

24 Claims, 12 Drawing Sheets

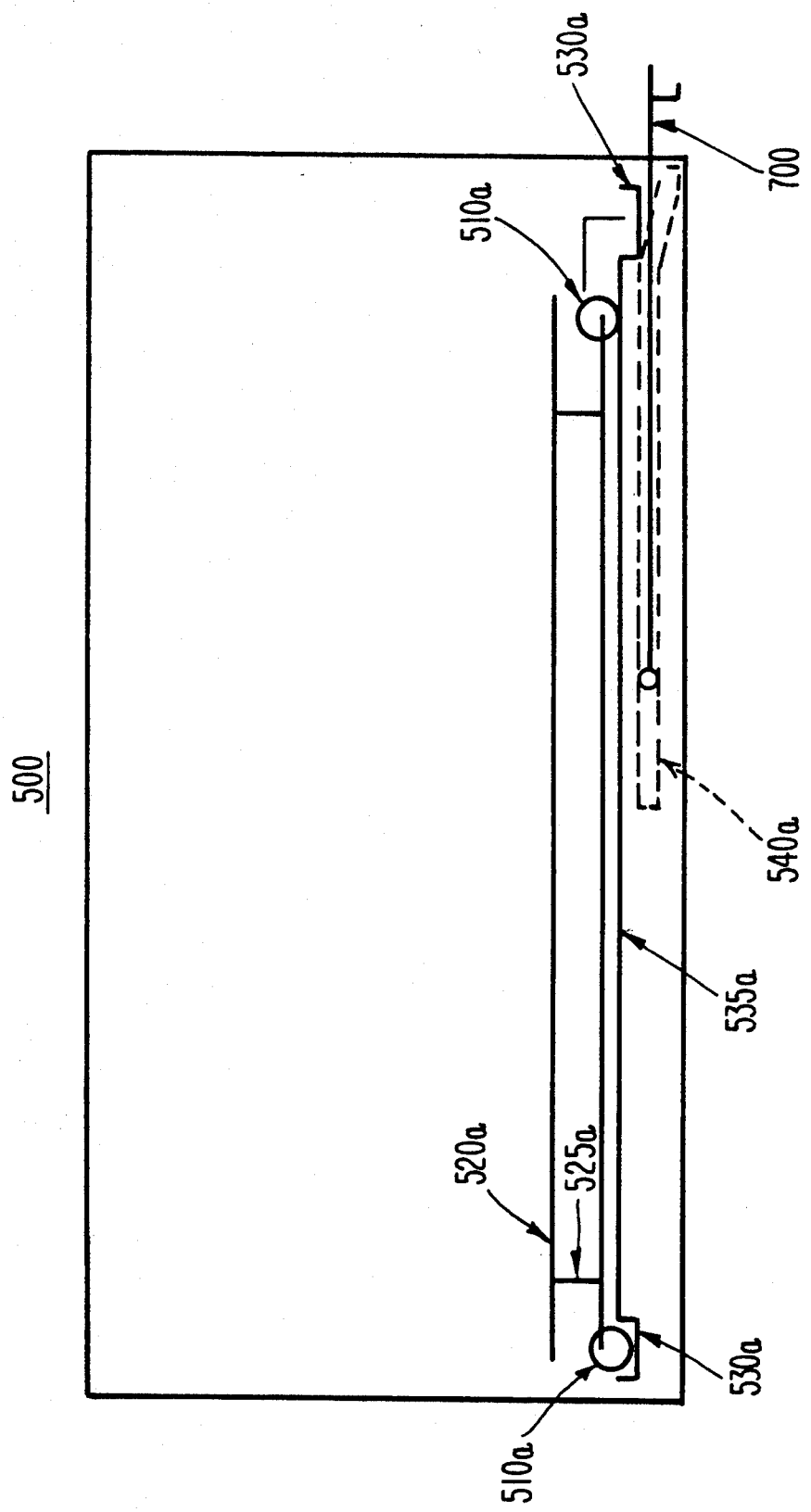

AUTOMOBILE RADIO SECURITY SYSTEM

BACKGROUND OF THE INVENTION

1. Field of the Invention

This invention is in the field of theft-prevention devices for protecting radios and the like in automobiles.

2. Background Art

Theft-prevention devices for car radios are well known in the prior art. The foundation for most of these devices is a mechanism which attaches to the dashboard either on the exterior surface or to the dashboard frame using screws or other mounting devices.

Other devices incorporate a theory of "obsolescence prevention." These devices make the radio inoperable when removed from the dashboard.

Yet another example of a theft-prevention device for car radios is described in U.S. Pat. No. 4,582,290 to Baron. This device incorporates the fire wall through the use of cables that run through a plate on the radio back through the fire wall. The two (2) cables have high-grade material heads inserted on them to prevent the pulling out of the radio. This device does not protect the condition of the radio and allows for much damage to the radio and the surrounding parts of the dashboard; without a guarantee that the radio will remain intact to the cables and/or the cables to the fire wall.

SUMMARY OF THE INVENTION

Notwithstanding the solutions evident in the prior art, there remains a growing need for an efficient, space-fitting, and durable device to protect automobile radios from theft and the damage that results when theft is attempted.

The present invention may therefore provide a theft-prevention device that rules out the use of both knowledge and force by the thief to remove the radio or damage it in the process of trying to remove it. The present invention may also provide a simple deterrent to thieves of car radios. Knowing that theft would require extensive time and effort with no guarantee of success provides a much needed deterrent to the thief. Finally, the present invention may provide a theft prevention device that is convenient to the user. Once installed, radio installation is simplified, yet the final installation will have a greater degree of security. Future radio repairs become easier and the authorized removal and replacement of the radio is simplified.

The theft-prevention device of the present invention incorporates a locked chamber into the dashboard using linked couplings that ultimately connect to the fire wall of the automobile (a strong, steel-reinforced wall protecting the passengers of a car from the engine and the dangers related to it). The present invention may incorporate any solid barrier or wall for installation. An alternate connection may also be made using the floorboard of an automobile and installing the system vertically from the floor instead of through the dashboard. Another connection may be made using the floor of the trunk, or a side of the trunk compartment for compact disc units, amplifiers, etc. The connection to the barrier wall may be vertical, horizontal, or any other angle depending on the position of the barrier wall. The linked system may even pass through other walls during its installation. An example would be mounting the system to a side wall, or fender of the car (under the trunk), and passing the extended linked system through the fire wall all the way to the front of the dashboard.

A rigid plate is secured to the outside of the barrier wall (the fire wall in this case) using solid, threaded bolts. These bolts originate from the inside face of the fire wall, through drilled holes and connect the rigid plate ("lock plate") to the base coupling. This initial coupling is the foundation for the security of the unit. This base coupling extends from the fire wall to the facade of the dashboard using individual couplings ("lock joints") locking into each other with male-female connections on each coupling. The couplings link to each other using either pin, bolt, or expanding clip (permanent method) mechanisms. The couplings are composed of different lengths and angles to accommodate any limited space for installation. During production, different linking mechanisms may be adopted to perform the same function. The entire system may even be a solid, one-piece construction produced to fit a specific automobile. The housing chamber has only a male coupling and is the last connection in the linked system. The box is a one-piece device with the only opening in the form of a front door, locked using a heavy duty key mechanism. This front door is the only piece of the unit in plain view from inside the automobile in most instances. A rigid X-bar secures the housing chamber to the dashboard for increased stability using a single bolt through the top side of the chamber (not required for normal operation; simply for added stability within the dashboard). The radio is simply inserted in the box through the front opening when the door is open. The radio is secured on a mounting plate inside the box using one of many connections: screws, hook and loop fasteners, fitted locking plate, etc. The mounting plate slides on rollers and can be controlled either manually or electronically (triggered when the door is fully opened). During production, a more extensive movement system may be adopted to fine-tune the system. The radio will then either be in one of two positions when not in motion. The one position is completely inside the chamber clear of the door's path when closing. The second is the position when the radio is in use by the passengers of the automobile. This second position is where the face plate of the radio lies flush with the face of the dashboard for full view of the instrumentation on the radio by the passengers of the automobile (the radio may be used when the door is in the closed position, as discussed later).

In operation, the key is inserted into the lock on the front door of the housing chamber and the door is then unlocked and opened, sliding to a hidden position under or above the radio (slides under in diagrams used in this patent). The mounting plate on which the radio is connected then slides out—either manually or electronically—to the "in use" position. The radio is locked within the housing chamber by simply retracting the mounting plate (clearing the way for the door) and closing the door. The door is locked and the radio is secure. The present invention secures and protects an automobile radio from any forceful attempt of theft.

The operation of the system may be refined using electronic enhancements. The front door and slide plate may be controlled electronically from a separate control system, a frequency-triggered remote control, a code system, or any similar form of locking device. The ignition switch may also be used to lock and unlock the system automatically with the insertion/removal of the automobile key. The system may even be connected to a car alarm and automatically close into the locked position when the alarm is armed. A separate shock sensor (within the housing chamber, for example) may even be incorporated with the system as a back-up for the normal alarm.

In the case of incorporating the present invention into automobiles during the actual production of the automobile, the linked system could be manufactured as a one-piece unit and implemented in the same way as described in this patent. The system may be constructed as part of the actual framework of the automobile.

Specific factors relating to the material used in constructing the elements of this system may improve the effectiveness of the invention. The material should be durable and able to withstand the force used when attempting theft. The material should have a defense against a reasonable level of heat given the fact that blow torches and the like may be used when attempting theft. The composition of the material depends on the expected abuse that the material may have to withstand during attempted theft. A slippery film, either inherent to the material, or added using an applied treatment, may even be advantageous to the effectiveness of the system by making the connections more difficult to grip by a thief.

BRIEF DESCRIPTION OF THE FIGURES

FIG. 5a shows another cross section of the housing chamber of the present invention.

DETAILED DESCRIPTION OF THE LOCK PLATE

Figure 1:
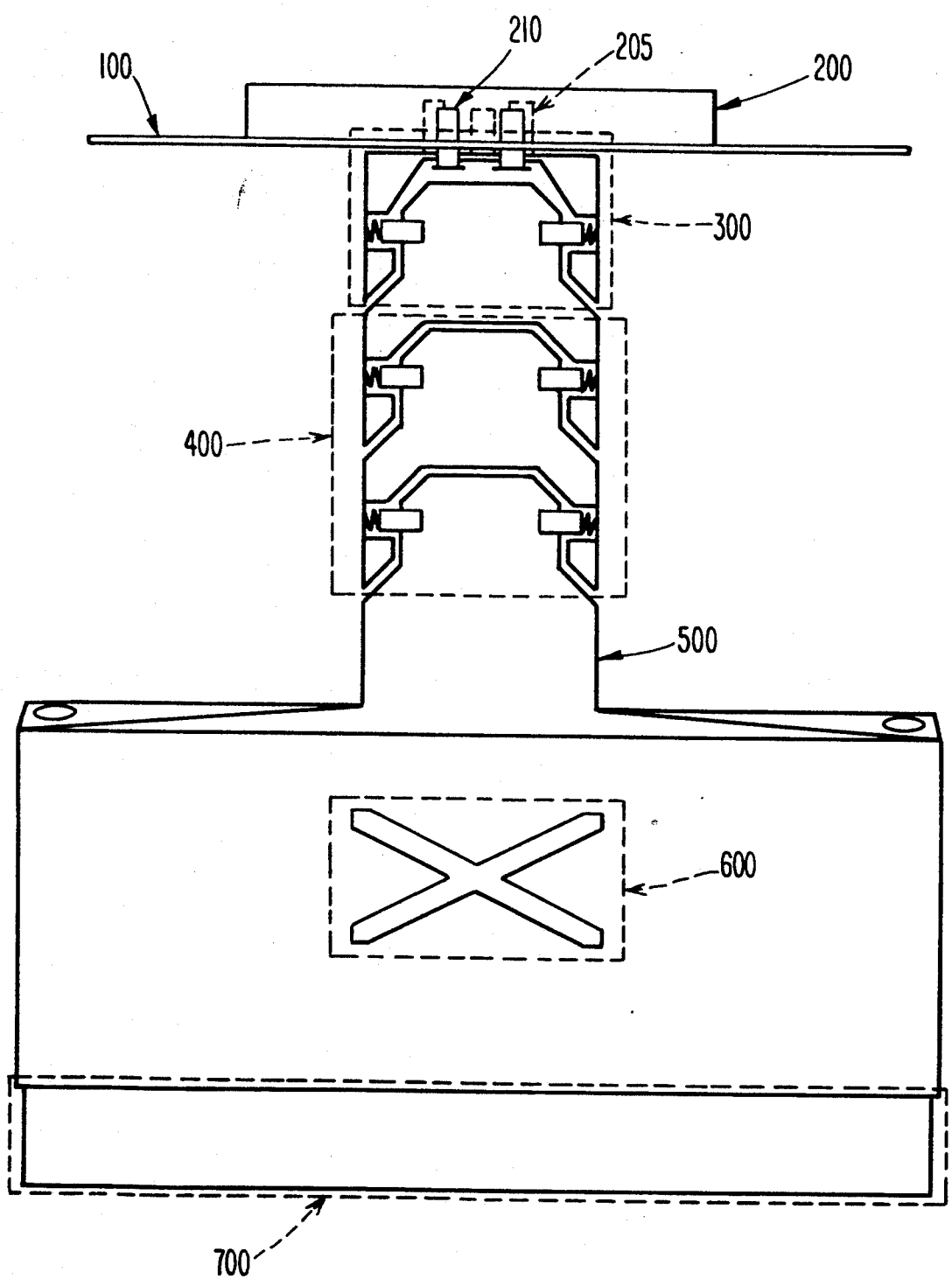
FIG. 1 shows a cross-section of the complete linking system of the present invention.

Referring now to FIG. 1 there is shown a linking system comprised of a lock plate 200, a base coupling 300, a couple of lock joints 400, the housing chamber 500 with X-bar attachment 600, and front slide door mechanism 700. All of these components comprise a linked coupling system which is secured to the automobile through the fire wall 100.

Figure 2:
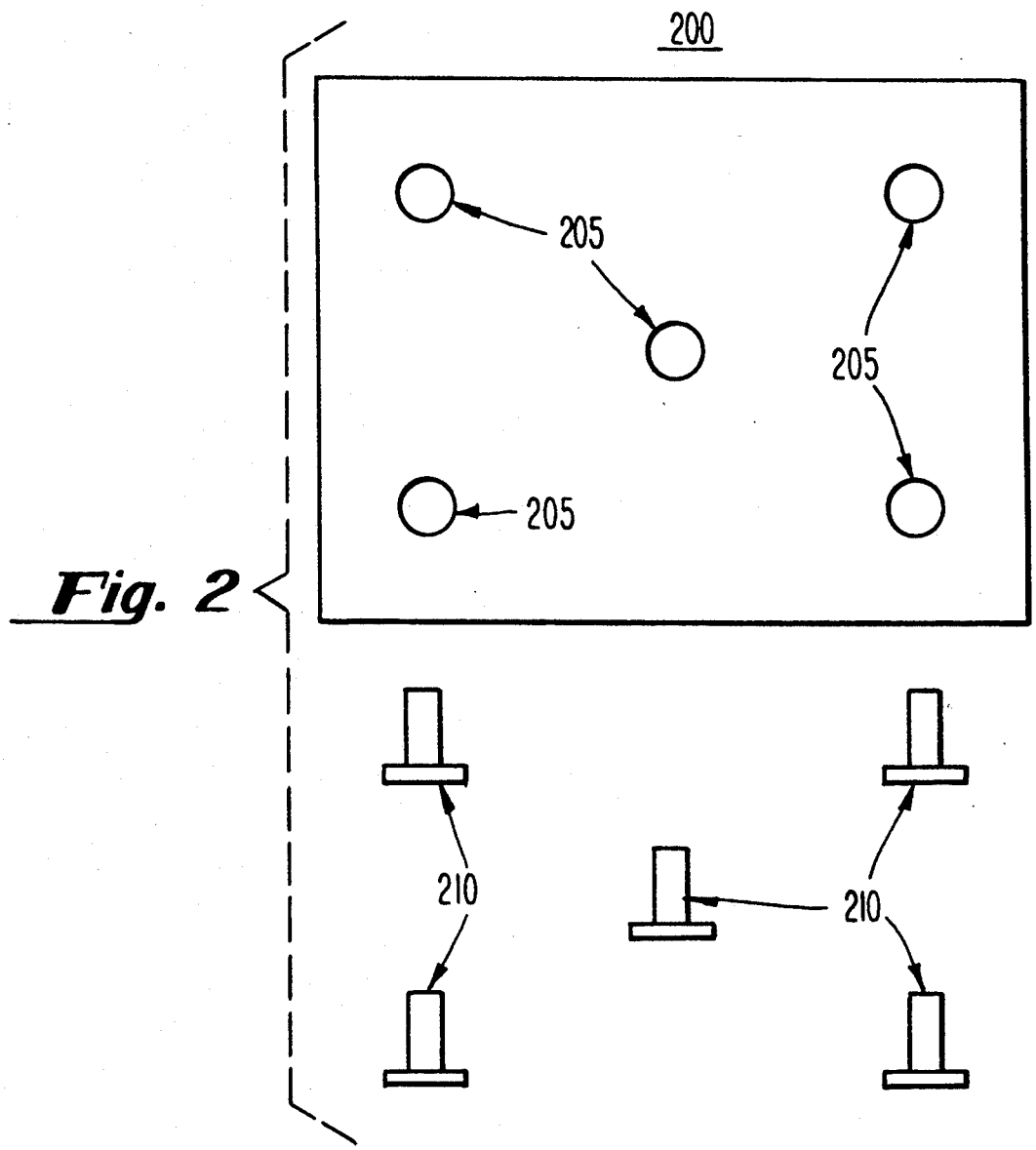
FIG. 2 is a cross-section of the lock plate and attachment bolts of the present invention.
Figure 2A:
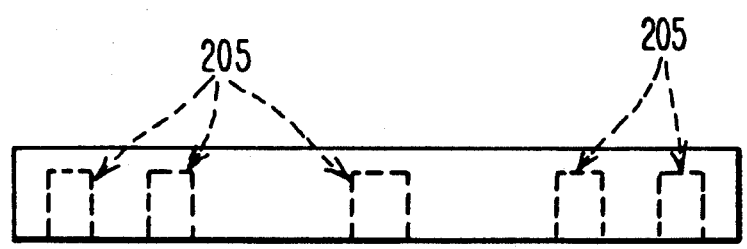
FIG. 2a shows another cross-section of the lock plate of the present invention.

Focusing more closely on the lock plate 200, shown in more detail in FIG. 2, there is shown five (5) threaded paths 205 which receive the five (5) fitting bolts 210. The rigid plate 200 is placed on the outside of the fire wall 100 (under the hood of the automobile) with the threaded paths facing the fire wall. Five openings are drilled through the fire wall to accommodate the bolts. The threaded paths in the lock plate do not extend completely through the plate as seen in FIG. 2a. This leaves no openings on the outside of the linking system to be tampered with by thieves. The connection is explained further when describing the base coupling 300 of the present invention.

DETAILED DESCRIPTION OF THE BASE COUPLING

Figure 3:
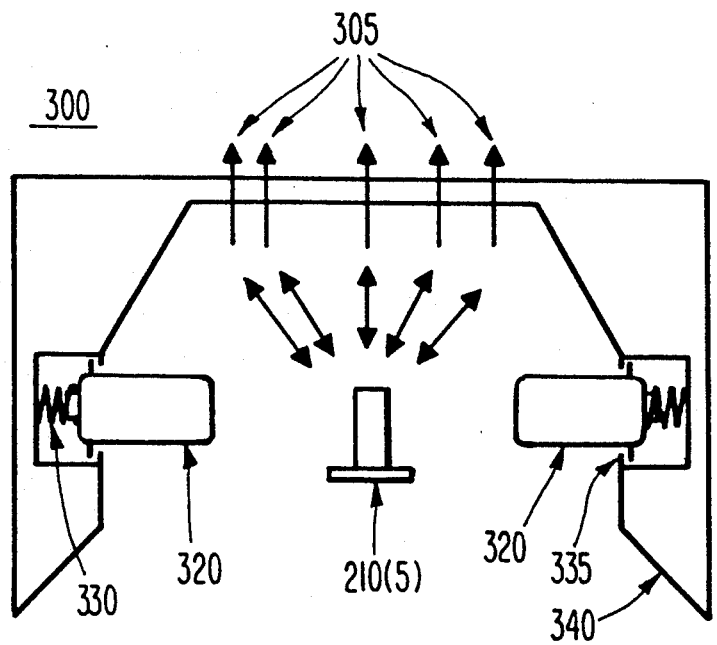
FIG. 3 is a cross-section of the base coupling of the present invention.

As shown in more detail in FIG. 3, the base coupling 300 will be the initial link in the coupling system. The coupling is a square block with a flat face on the one end and a square opening on the other to accommodate the male ends of the successive lock joint 400. The square opening extends into the block continuing up to the back of the front face: about on-half of an inch from the end of the block. Five holes 305 are present in this face (front) of the base coupling. The five (5) locking bolts 210, discussed in the description of the lock plate, are passed through the base coupling through these five holes and then passed through the five drilled holes in the fire wall 100 into the lock plate 200 on the outside of the fire wall. The bolts are secured by screwing them into the threaded paths 205 of the lock plate. Lock washers, silicone, glue, or the like can be used to prevent loosening of the bolts from vibration. The base coupling 300 is now attached to the lock plate 200 and to the automobile through the fire wall 100. Although a square, block shape is adopted for the components of the linked system, another shape may be adopted using the same system. An alternative shape would be round components (lock joints and connections) resulting in a tubular system.

A rigid plate may be fitted between the base coupling and the fire wall and act as a washer for the base coupling. The plate would have five holes corresponding to the pattern on the base coupling and the lock plate. The size would be larger than the area of the face of the base coupling so as to cover a larger area of the fire wall and make the connection more secure. No specific shape is required here, but the fact remains that the larger the area covered by the plate, the more secure the system.

The base coupling 300 is comprised of lock pins 320 which fit into the entering male end of the lock joint 400. The pins 320 are attached to springs 330 and move in and out as pressure is applied to them. The pin has a flush connection with the spring, so it does not move or spin independently from the spring. The pin fits as close as possible within its chamber for added stability. The base of the pin would extend far enough within the housing chamber (where the spring lies) to prevent any rocking or other movements other than the desired horizontal movement. Tabs 335 limit the pin movement to a certain stoppage point and add stability. The shape of the pin adopted for the present invention is square with rounded edges to respond better to the incoming head of the lock joint. The shape of the base coupling is structured so that the lock joint 400 will fit precisely into the base coupling 300. The last contact when the two units are attached comes at the fitted angles: 340 in the base coupling, and 440 in the lock joint.

In operation, the face angle 440 of the lock joint 400 applies pressure on the lock pins 320 and thus causes them to retract by spring contraction. The lock joint 400 is entered even further until the lock pins 320 release into the entrance paths 450 of the lock joint 400. The lock pins 320 release until the tabs 335 meet and limit further outward movement. At this position, the lock pins fit flush into the entrance paths 450 for the greatest stability. The paths are shaped so as to accept the lock pins perfectly with the least amount of space between the walls of the paths and the sides of the pins.

DETAILED DESCRIPTION OF THE LOCK JOINT(S)

Figure 4:
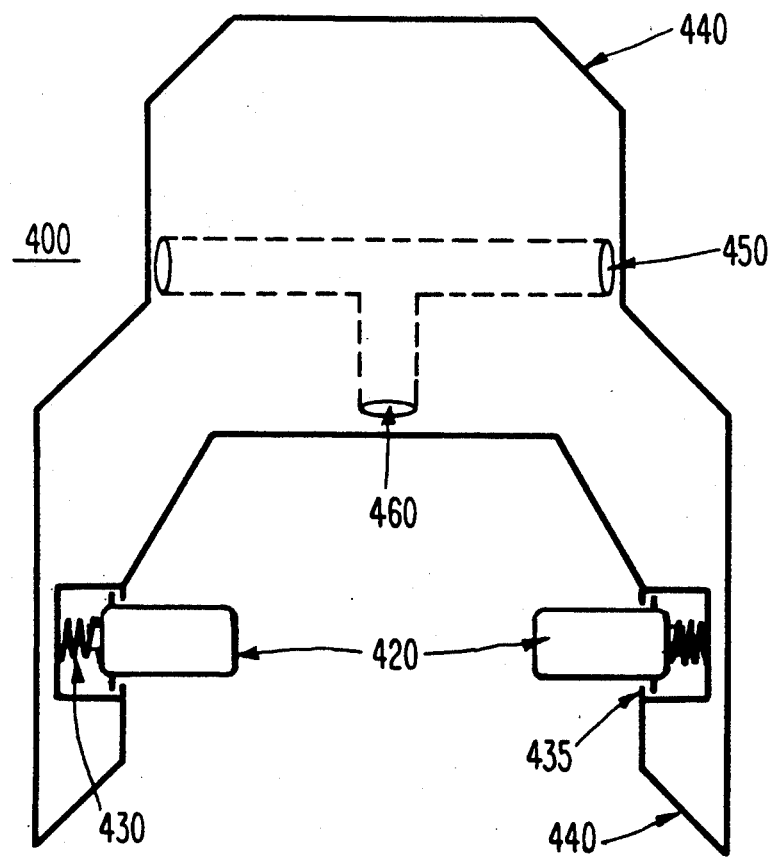
FIG. 4 is a cross-section of the lock joint(s) of the present invention.

The lock joint 400 as shown in FIG. 4 links the base coupling 300 to the housing chamber 500 by creating a linked system through connected joints, each with male and female couplings at each end of the unit. These joints are the lock joints 400 of the present invention. The female (open) end of the lock joint is identical to the female end of the base coupling 300 comprised of a spring mechanism 430, lock pins 420, and limiting tabs 435. The male (front) end of the lock joint 400 has fitting angle 440, and drilled paths 450 for the receiving of the lock pins from both other lock joints 420, and the lock pins of the base coupling 320. The perpendicular connected path 460 allows the lock pins to be retracted, thus enabling lock joint removal by the use of the removal tool 800.

In operation, the face angle 440 of another entering lock joint 400 applies pressure on the lock pins 420 and thus causes them to retract by spring contraction. The lock joint 400 is entered even further until the lock pins 420 release into the entrance paths 450 of the lock joint 400. The lock pins 420 release until the tabs 435 meet and limit further outward movement.

Figure 4A:
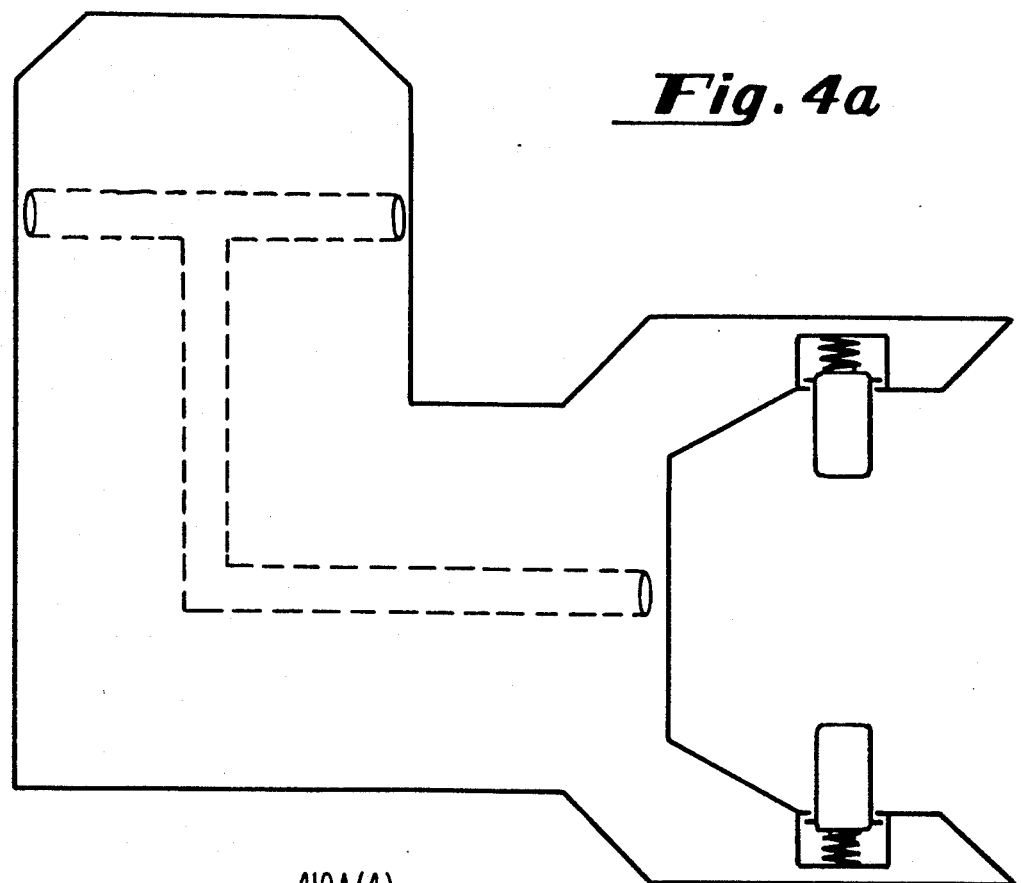
FIG. 4a shows another version of the lock joint of the present invention.

The lock joint 400 can be manufactured in different shapes and lengths so as to accommodate the different limited space in different automobiles. An example of a different shape is presented in FIG. 4a. The lock joint is angled 90 degrees to enable "turns" of the linking system and allow fitting into any type of automobile.

Figure 4B:
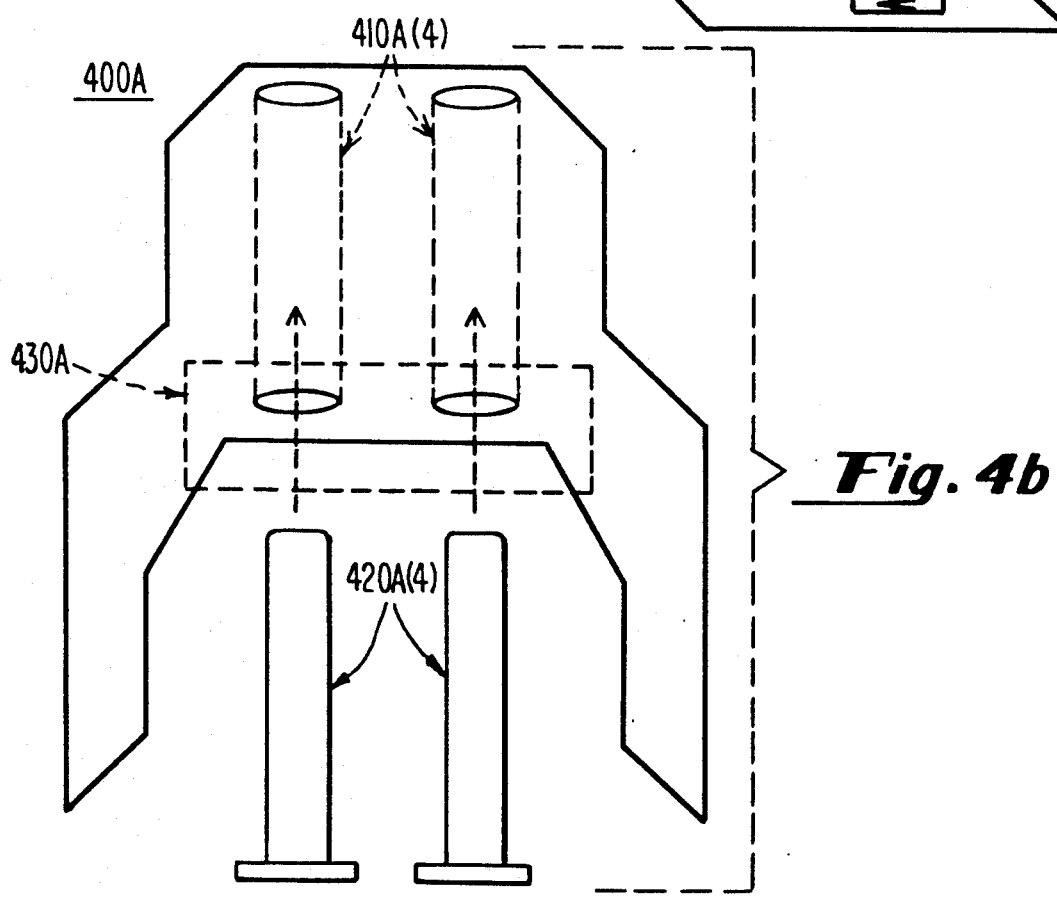
FIG. 4b is a cross section of an alternate linking system of the lock joint of the present invention.
Figure 4C:
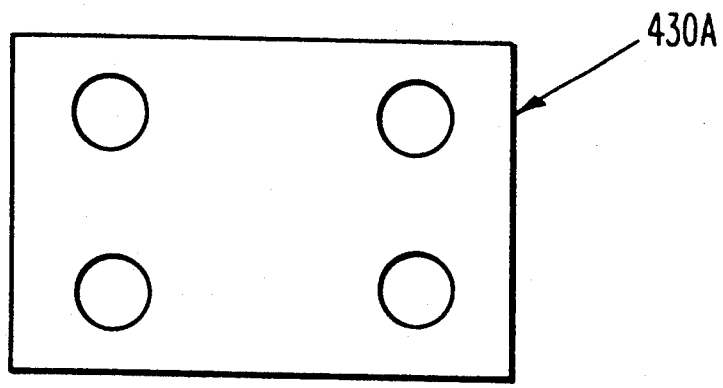
FIG. 4c shows another view of the alternate linking system of the lock joint of the present invention.

Alternative embodiments of the lock joint of the present invention may use different connections between the joints and may also be applied to the female (receiving) end of the base coupling. A first alternative as shown in FIG. 4b, uses a double bolt 420A system that extends through the male end of the lock joint to the female end. Each lock joint has four threaded paths 410A extending completely through the solid male end. Looking at the lock joint from the female end the inside face appears as shown in FIG. 4c.

In operation, the lock joints are fitted into each other and two (2) bolts are screwed all the way through from the one lock joint to the other. For this operation, the bottom left-hand hole is used along with the upper-right hand hole. Either way, the pattern should be diagonal to insure stability. As the next joint is attached, the two empty holes will be screwed into by the two bolts from the successive joint, and the process continues until the link system is complete. As described, the order of the diagonal pair of holes will be switched with each new attachment.

Figure 4D:
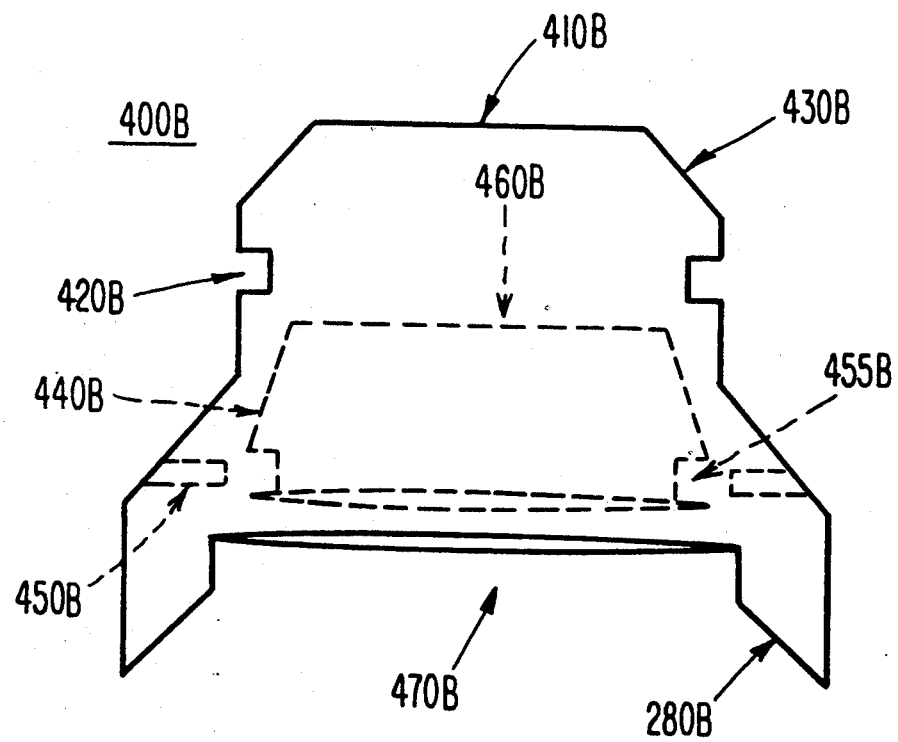
FIG. 4d shows yet another alternate linking system of the lock joint of the present invention.

FIG. 4d depicts yet another lock joint for use with the present invention. This alternative offers a permanent linking system that cannot be removed from the automobile without the removal of part of the fire wall (the part that the system is attached to). This lock joint 400B is comprised of an internal clip within the lock joint that allows for permanent connections.

In operation, the front of the joint 410B enters the female opening with fitted angled tail 480B. The angled head 430B fits securely against angled tail 480B when inserted completely. As the front of the joint 410B enters the rear opening 470B of another joint, the internal clip 440B expands from the outward pressure applied by the angled head 430B. The internal clip 440B expands until the front indents 420B lock into the indents of the internal clip 455B, which simultaneously lock into the internal tabs 450B. The connection is now complete. These joints 440B can be manufactured in different sizes and angles just like the other alternative lock joints. An alternative linking system may be adopted during production to enhance the stability of the system and simplify installation.

DETAILED DESCRIPTION OF THE HOUSING CHAMBER

Figure 5:
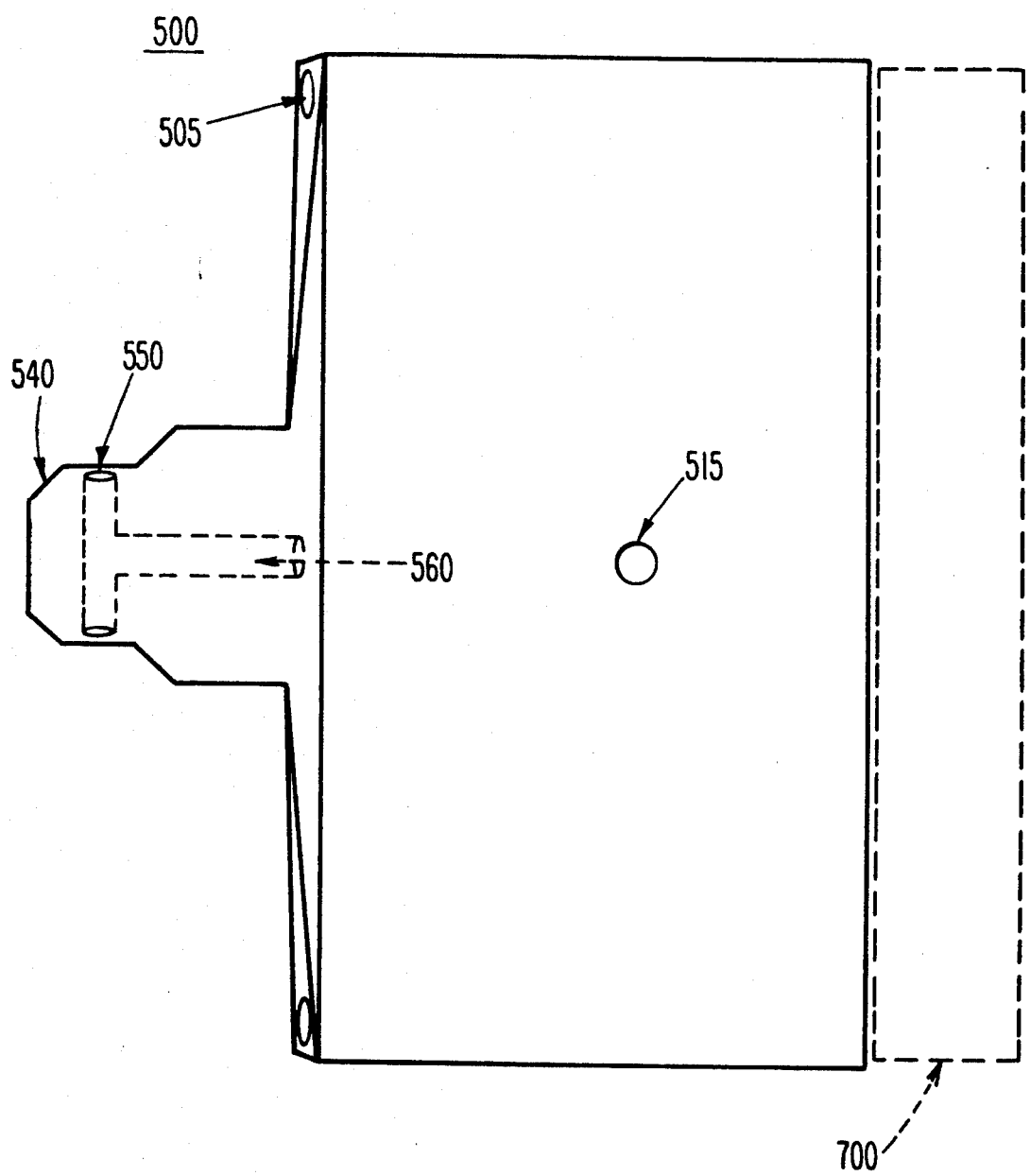
FIG. 5 shows a cross section of the housing chamber of the present invention.

The housing chamber as shown in FIG. 5 is the final connection of the linked system. The housing chamber has a male joint connection with fitted angles 540 identical to the lock joints so it can connect to the female end of the previous lock joint. This male end of the housing chamber has a drilled path 550 for the receiving of the lock pins from the previous lock joint 420. The perpendicular connected path 560 allows the lock pins to be retracted, thus enabling removal by the use of the removal tool 800 (assuming that lock joint 400 in FIG. 4 is used in the link system). The drilled hole 515 allows connection to the X-bar 600 with a bolt screwed vertically through the top (ceiling) of the housing chamber into the threaded path within the X-bar 600. The two holes 505 on the back of the housing chamber allow for the connection of wires from the automobile radio to the automobile wiring (including antenna).

In operation, the wiring of the radio is connected to a female wiring harness and attaches to a male harness which holds all of the automobile's wires. The female harness is situated within the housing chamber and male harness is connected from the outside, plugging into the female harness. This female harness will have a large rim, making it impossible to fit through the harness hole 505. Thus, when the automobile wires are pulled forcefully, the male harness is released, but the female harness remains protected within the housing chamber. All of the wiring may be connected to the male/female harnesses and use one of the two holes 505, while the antenna may travel through the other hole 505. Gaskets may be incorporated within these holes to prevent dust, water, pressure (airplanes, boats, submarines, . . . ), and other outside embodiments from entering the housing chamber; thus protecting the condition of the radio. As an added protection against thieves, any type of locking flaps may be incorporated into the chamber so that the holes will be closed when there are no wires or cables passing through them. This makes the inside of the housing chamber inaccessible even when the wires are pulled out. Once the flaps or covers (located inside the housing chamber) are closed, they may only be reopened from the inside of the housing chamber.

A cross section showing the internal workings of the housing chamber is shown in FIG. 5a. A rigid track 535a is built into the housing chamber and has two steps 530a that drop down a notch. One step is in the front of the track and one is in the back. The mounting plate 520a is the mechanism riding on the track 535a. The mounting plate is connected to a lower plate which connects the mounting plate to rollers 510a. These rollers ride on the track 535a and fall into one of the two steps 530a to become temporarily stopped and secured. A similar track system 540a is built into the housing chamber under the mounting plate to accommodate the front slide door 700. The track system 540a simply houses the slide door when open and allows for its mobility. Alternative motion systems may be incorporated during production to enhance the effectiveness of the system and aid the user.

In operation, the automobile radio is secured to the mounting plate 520a. The door is opened and the rollers 510a are pulled forward by pulling the mounting plate forward. The rear rollers exit the back step 530a in the track and roll forward until the front rollers fall into the front step 530a of the track. The radio now sits forward and its face is clear of the housing chamber and ready for use. For retraction, the opposite motion is used. In production, an electrical mechanism may be implemented controlling the movement of the mounting plate 520a through a push-button mechanism or simply triggered by the opening of the front door. Other variations may be incorporated to simplify the use of the system as mentioned earlier (remote control, code system, . . . ).

Figure 5B:
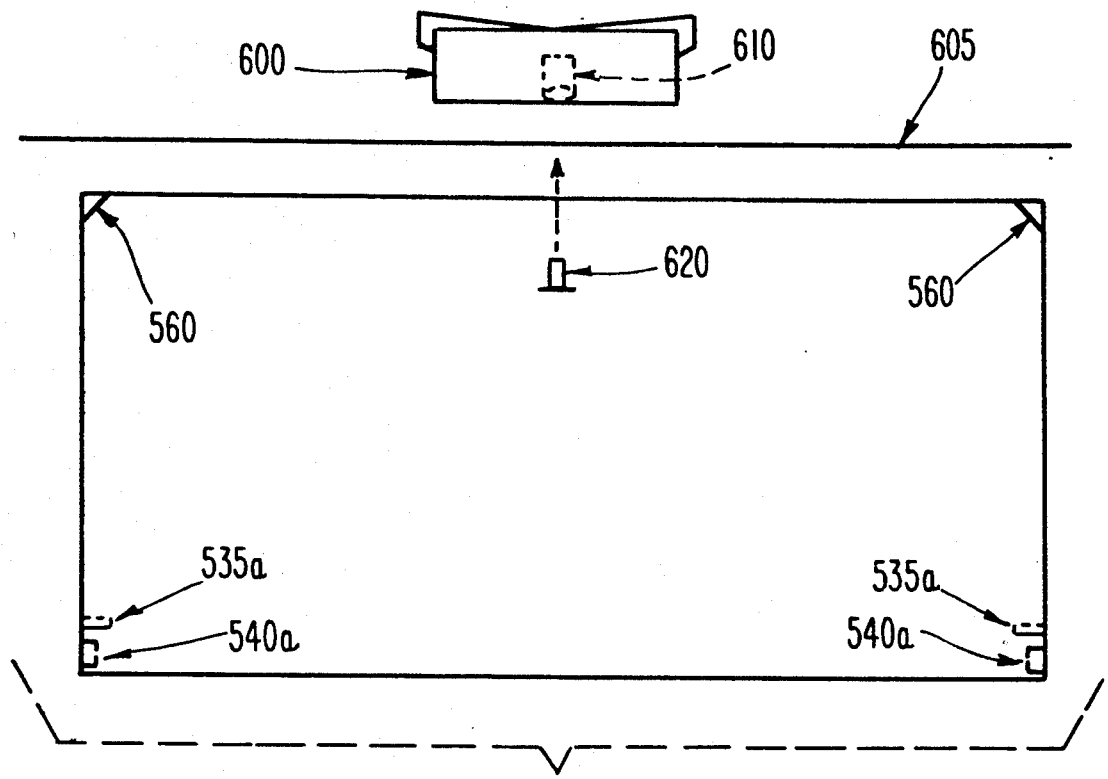
FIG. 5b shows yet another cross section of the housing chamber including X-bar attachment of the present invention.

The track systems are shown from a front view in FIG. 5b as is the connection of the X-bar 600 to the housing chamber. The front view of the housing chamber also shows two diagonal tabs 560 located in the top corners of the housing chamber. These tabs add stability to the front door by enforcing the weak links against force when the front door is in its closed position.

DETAILED DESCRIPTION OF THE X-BAR

Figure 5C:
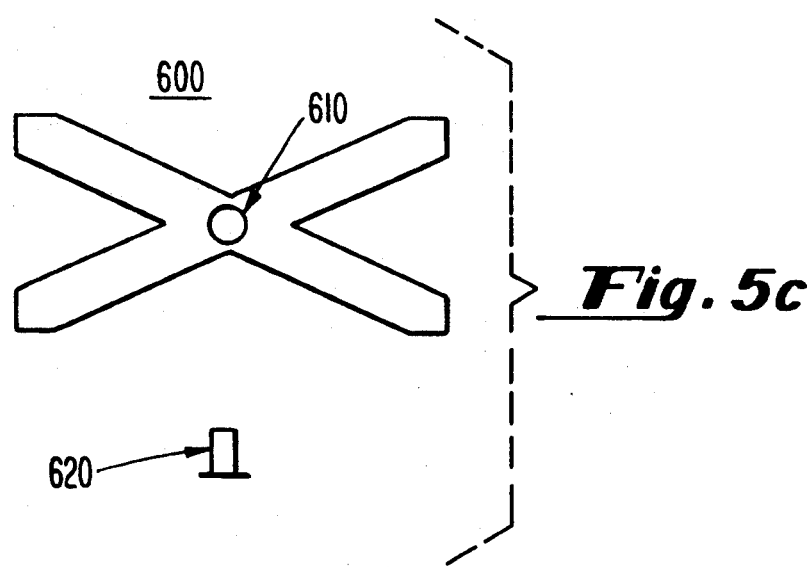
FIG. 5c show the X-bar attachment of the present invention.

As shown in FIG. 5b the X-bar attaches to the housing chamber 500 by a bolt 620 that travels through a hole in the top of the housing chamber 515, through a hole drilled through the dashboard 605, and screws into the threaded path 610 within the X-bar. The threaded path 610 does not completely travel through the X-bar. It is a drilled path reaching half-way up through the depth of the X-bar. Therefore, there is no access to the bolt 610 from outside the mechanism. The construction of the X-bar is shown in FIG. 5c and is simply a solid, rigid mechanism in the shape of an "X" to cover the maximum area while using the minimum amount of space. The threaded path 610 appears to be drilled entirely through the X-bar in FIG. 5c, but it is actually only half the way through the complete depth. During production the hole 515 may be incorporated at other points depending on the installation requirements. The hole and subsequent installation of the X-bar may be made through the base of the housing chamber (below), or even on one or more sides.

DETAILED DESCRIPTION OF THE MOUNTING PLATE

Figure 6:
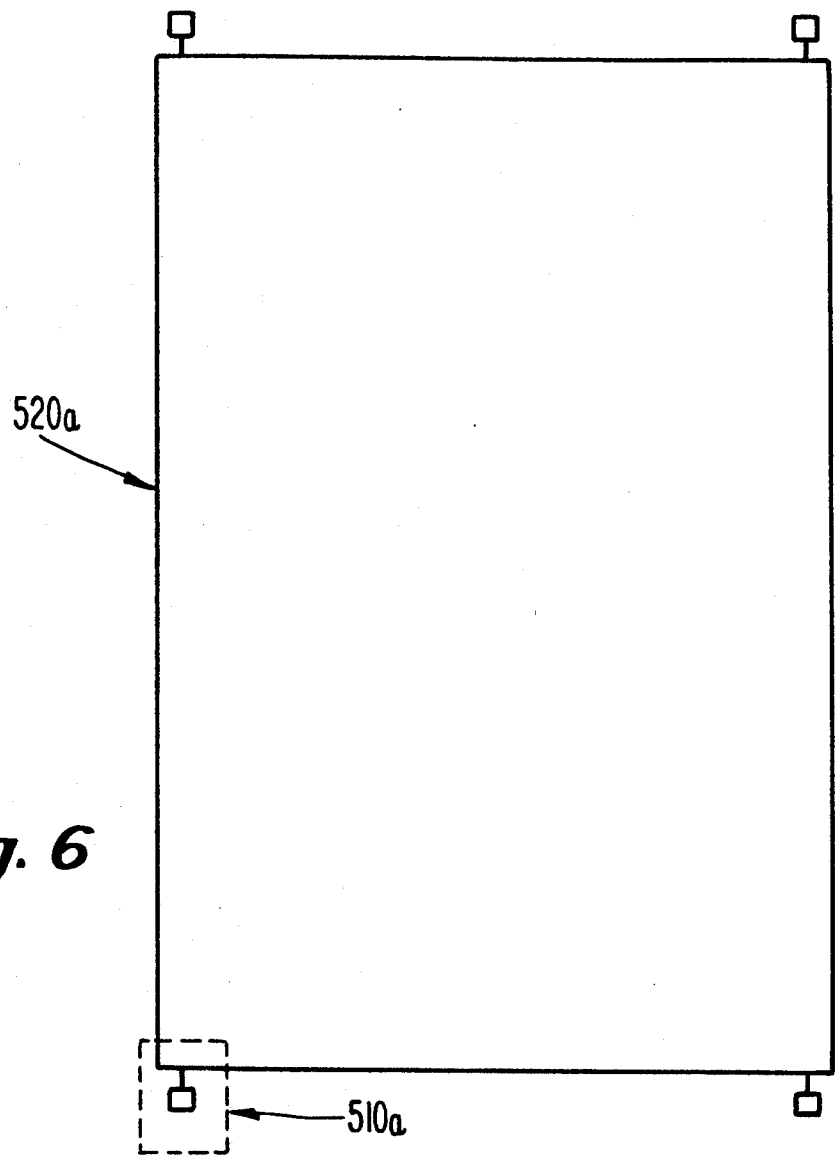
FIG. 6 shows the mounting plate within the housing chamber of the present invention.
Figure 6A:
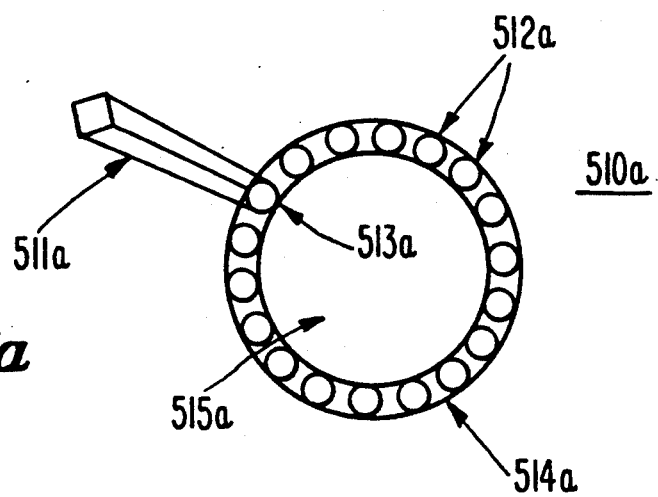
FIG. 6a shows a cross section of the bearing rollers of the mounting plate of the present invention.

As shown in FIG. 6, the mounting plate 520a is the only direct contact that the automobile radio has with the linked system. The automobile radio is secured to this plate through the use of hook and loop fasteners, screw/bolt system, or the like. The plate 520a travels on four rollers 510a. As shown in FIG. 6a, these rollers are connected to the plate through rod 511a. This rod 511a is connected to a fitted ball bearing 513a. This connection may be made during the production process and manufactured as a one piece mechanism. The empty path 514a is filled with individual ball bearings that enable stability and lubrication during the movement of the rollers 510a.

In operation, the rod 511a travels around the roller while moving. The rod follows the path of the roller through the path of the ball bearings 512a. During production, and with the adoption of electronic automation, alternative movement systems may be adopted.

DETAILED DESCRIPTION OF THE SLIDE DOOR MECHANISM/FRONT DOOR

Figure 7A:
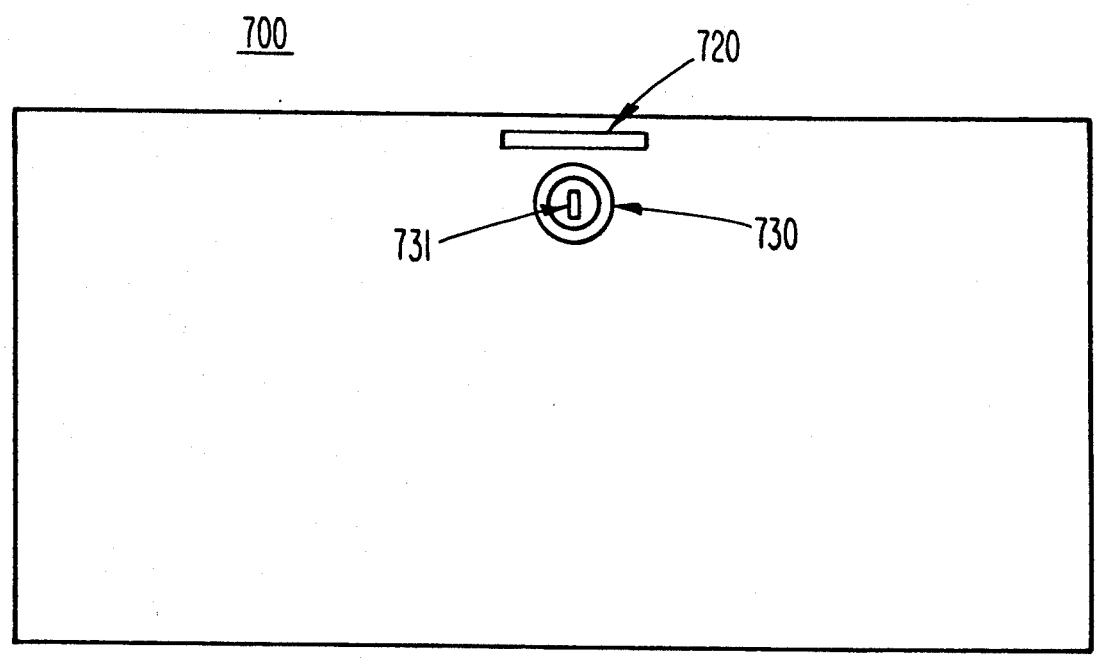
FIG. 7a shows another cross section of the slide door mechanism of the present invention.
Figure 7:
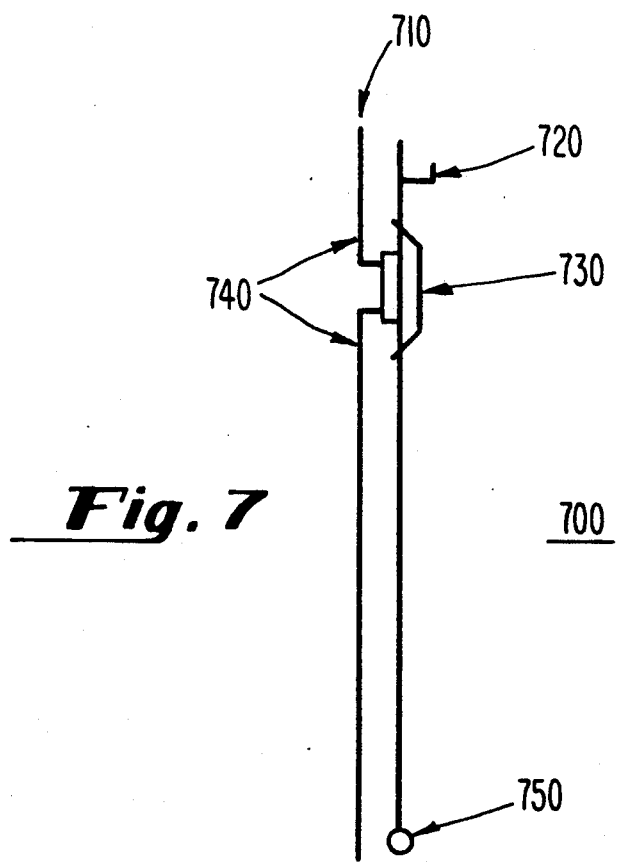
FIG. 7 shows a cross section of the slide door mechanism of the present invention.

As shown in FIG. 7, the slide door mechanism is composed of a lock 730, an "L" handle 720, and a base plate with bearing tip 750. The mechanisms 710, and 740, represent components of the lock mechanism 730 which is not defined within the present invention, but will be adopted during production. This lock 730 may be a key-system locking and unlocking the slide door. The handle 720 simply allows the user to open and close the door conveniently. The base plate with bearing tip 750 is the actual door mechanism. The bearing tip fits into the slide track 540a detailed in FIGS. 5a and 5b. A front view of the slide door is shown in FIG. 7a with handle 720 and key lock 730 with key insertion slot 731. The locking system of the front door may be one of alternative embodiments as mentioned previously. Any special key, remote control, or the like may trigger the entire system and make the movements fully automated with limited effort by the user. The front door may be of a hinged-type (such as many garage doors) or another alternative composition as long as the door is rigid and stable when in the closed position and protecting the radio. A further enhancement may be the addition of a gasket(s) to prevent dust, water, dirt, and other external embodiments from entering the housing chamber. This may be specifically advantageous to vehicles where the unit is exposed to the outside environment such as farm equipment, motorcycles, boats, etc. Yet, a further enhancement may be to allow closing of the front door during operation when desired by the user. This allows the radio to be used during extended periods without exposure to the environment's elements.

DETAILED DESCRIPTION OF THE REMOVAL TOOL

Figure 8:
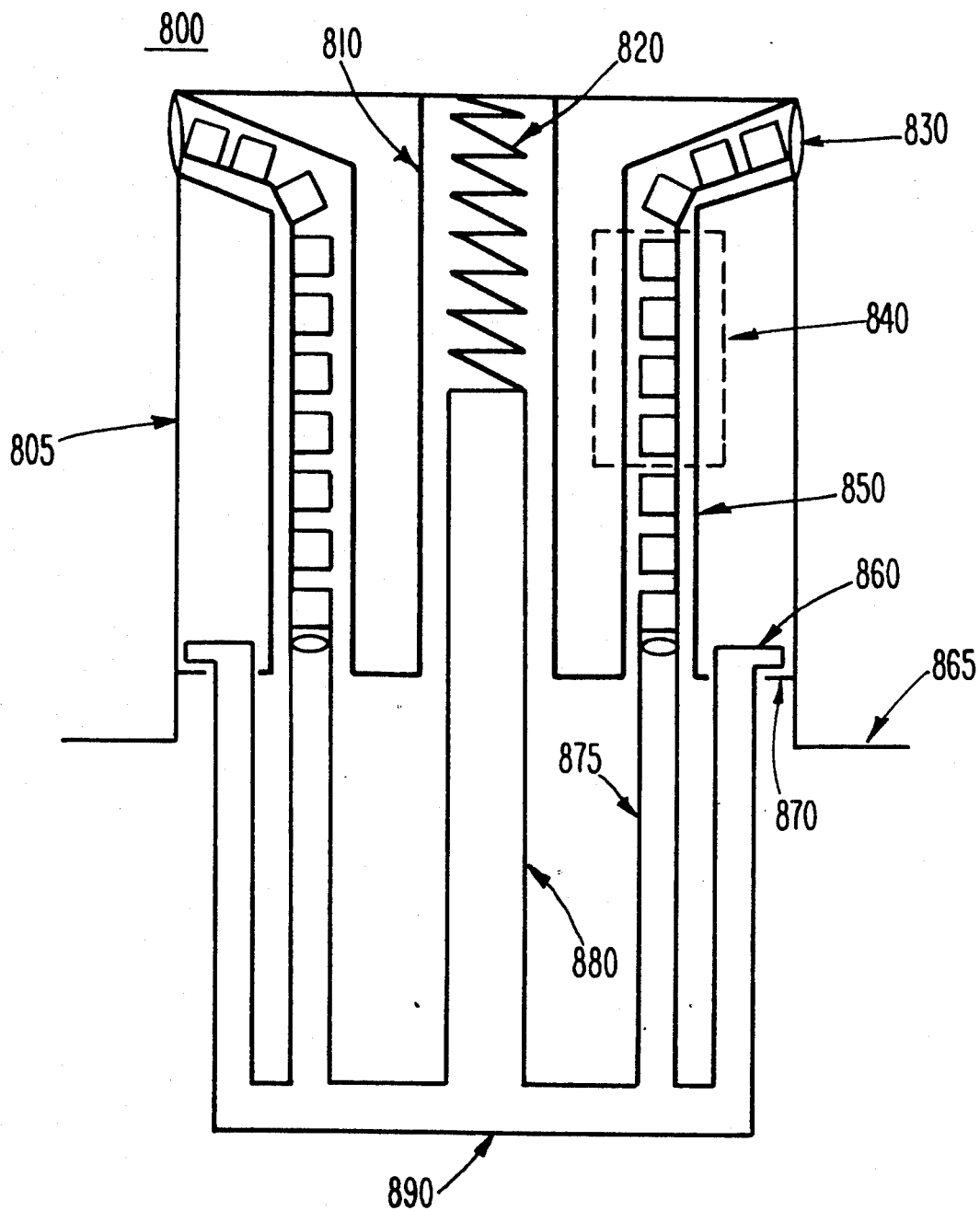
FIG. 8 is a cross section of the removal tool of the present invention.

Removal tool 800, as shown in FIG. 8, provides a mechanism for the removal of all of the couplings within the entire link-system. This tool becomes obsolete if the permanent alternative lock joint is adopted as shown in FIG. 4d. The removal tool 800 is comprised of a base housing 805, central pressure lane 810, push housing 890, pressure rod 880, pressure rod spring 820, side vents 830, pivoting cable 840, travel lanes 850, tool rests 865, limit tabs 870, "L" brakes 860, and push tubes 875.

Figure 8A:
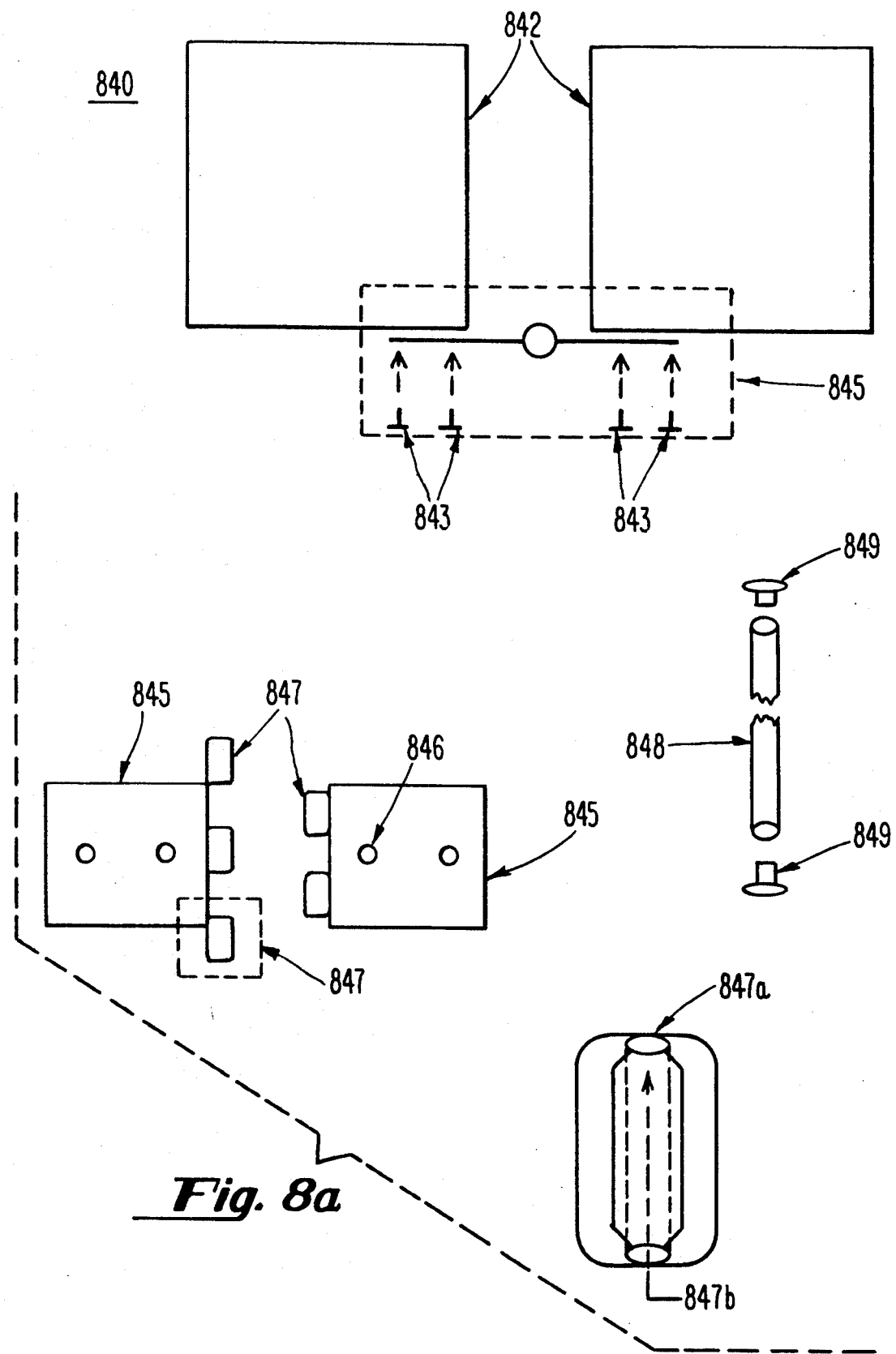
FIG. 8a is a cross section of the pivoting cable within the removal tool of the present invention.

The pivoting cable 840 is shown in greater detail in FIG. 8a. Solid blocks 842 compose the cable and are attached to each other by plates 845 and pivots 847. The plates are attached to the blocks by screws inserted through holes 846 in the plates. The pivots 847 have a drilled path through each 847a, 847b, and when the blocks are connected, the pivots are lined up and a hollow rod 848 is passed through all of them and capped with tabs 849 that fit into the ends of the hollow rod 848. The pivots revolve around the rod and allow for the blocks 842 to pivot.

In operation, the tool is inserted into the drilled paths of coupling being removed (example 560 of housing chamber) until the tool rests 865 reach the surface of the coupling and fit the tool into place. The push housing 890 is then pushed forward. The forward movement moves the push tubes 875 and they force the pivoting cable 840 to move forward, exiting the base housing 805 through the side vents 830 and releasing into the drilled paths (example 550 of housing chamber). The action is continued until the cable reaches the lock pins (not shown) and pushes them out of the path chamber. At this point the position of the tool is sustained until the coupling is removed. Once removed, the tool is released and the pressure rod spring 820 retracts, moving the pressure rod 880 out of the central pressure lane 810 and releasing fully until the "L" brakes 860 reach the limit tabs 870 to prohibit further movement and return the removal tool 800 back to its original position. The pivoting cable 840 retracts as well following the push tubes 875 to which they are attached. The cables return back to being fully housed within the travel lanes 850. The removal is complete.

This removal system is specifically designed for the link system adopted for the present invention. A different link system would obviously require a different removal system.

While the foregoing invention has been described with reference to specific embodiments, it shall be understood that this invention can be implemented in other ways, and can be modified without avoiding the spirit of the invention which is defined with reference to the appended claims.

I claim as my invention:

1. A secure mounting enclosure for an electronic device, adapted to be fixed in place by attachment to a structural member of a vehicle or similar structure, and to provide a completely surrounding enclosure for said device, said enclosure having a wall capable of being opened to provide access to said device and; wherein said enclosure is secured to said structural member by at least a mating pair of male and female locking elements, one of said elements being securely affixed to said structural member, and the other of said elements being securely affixed to said enclosure.

2. The mounting enclosure of claim 1 wherein said enclosure is secured to a vehicle fire wall, or floor board.

3. The mounting enclosure of claim 2 wherein said wall is moveable to permit access to the interior of said enclosure.

4. The mounting enclosure of claim 3 wherein said wall is secured by a lock mechanism.

5. The mounting enclosure of claim 2 wherein at least one wall of said enclosure protrudes through a cosmetic panel member of said vehicle.

6. The mounting enclosure of claim 5 wherein said enclosure is stabilized to said cosmetic panel by an X-bar.

7. The mounting enclosure of claim 1 wherein one of said locking elements comprises at least a pair of opposed locking lugs, said lugs being biased toward the other locking element, and said other locking element comprises lug receiving indentations, said indentations adapted to engage said biased lugs.

8. The mounting enclosure of claim 7 wherein said indentations comprises bores adapted to receive said lugs.

9. The mounting enclosure of claim 7 wherein said indentations comprise one or more grooves adapted to receive said lugs.

10. The mounting enclosure of claim 7 wherein said lugs protrude outwardly from said mail locking element, and said indentation is located within the interior of said female element.

11. The mounting enclosure of claim 7 wherein said lugs protrude inwardly from said female locking element, and said indentation is located on the exterior of said male element.

12. The mounting enclosure of claim 1 wherein said enclosure is comprised of a material capable of withstanding physical attack.

13. The mounting enclosure of claim 12 wherein said material is metal.

14. The mounting enclosure of claim 12 wherein said material is sheet steel.

15. The mounting enclosure of claim 12 wherein said material is a composite.

16. The mounting enclosure of claim 1 wherein said enclosure further comprises access ports, said ports being environmentally sealed.

17. The mounting enclosure of claim 1 further comprising an internal moveable carriage for attachment of said device.

18. The mounting enclosure of claim 17 wherein said carriage moves from a first position entirely within said enclosure to a second position partially within said enclosure in response to operation of said access wall.

19. A secure mounting enclosure for an electronic device, adapted to be fixed in place by attachment to a structural member of a vehicle or similar structure, wherein said enclosure is secured to said structural member by at least a mating pair of male and female locking elements, one of said elements being securely affixed to said structural member, and the other of said elements being securely affixed to said enclosure, wherein said male locking element comprises at least one annular groove, and said female locking element comprises at least one annular groove, said annular grooves being co-located when said locking members are assembled, and being capable of receiving a locking clip which expands to occupy the annular space formed by said co-located annular grooves and to provide a completely surrounding enclosure for said device, said enclosure having a wall capable of being opened to provide access to said device.

20. The mounting enclosure of claim 19 wherein said male locking element comprises at least one annular groove, and said female locking element comprises at least one annular groove, said annular grooves being co-located when said locking members are assembled, and being capable of receiving a locking clip which expands to occupy the annular space formed by said co-located annular grooves.

21. The mounting enclosure of claim 19 wherein said locking clip is of sufficient width to at least partially occupy both of said co-located annular grooves.

22. The mounting enclosure of claim 19 wherein said locking clip is of an irregular shape adapted to at least partially occupy both of said co-located annular grooves.

23. The mounting enclosure of claim 19 wherein said locking clip is resiliently deformable to permit assembly of said male and female members.

24. The mounting enclosure of claim 20 wherein said locking element comprises at least three members, being a base attached to said structural member, an intermediate member attached to said base, and said enclosure attached to said intermediate member, wherein the connection between said base member and said intermediate member comprises an angularly opposed pair of fasteners, and the connection between said enclosure and said intermediate member is by an angularly opposed pair of fastners which is displaced angularly from said base to intermediate connection.

* * * * *